United States Patent [19]

Shibata

[11] 4,404,260

[45] Sep. 13, 1983

[54] MAGNETIC RECORDING MEDIUM AND METHOD OF MANUFACTURE

[75] Inventor: Fujio Shibata, Komoro, Japan

[73] Assignee: TDK Electronics Co., Ltd., Tokyo, Japan

[21] Appl. No.: 401,405

[22] Filed: Jul. 23, 1982

[30] Foreign Application Priority Data

Jul. 25, 1981 [JP] Japan ............................... 56-116832

[51] Int. Cl.$^3$ ............................................. H01F 10/02
[52] U.S. Cl. ................................. 428/458; 252/62.54; 427/127; 427/128; 427/130; 427/132; 428/474.4; 428/694; 428/695; 428/900
[58] Field of Search ..................... 428/458, 474.4, 694, 428/695, 900; 427/127, 128, 130, 132; 252/62.54

Primary Examiner—Bernard D. Pianalto
Attorney, Agent, or Firm—Wyatt, Gerber, Shoup, Scobey & Badie

[57] ABSTRACT

A magnetic recording medium, having formed on the surface of a non-magnetic substrate, a layer of the dispersion in a binder vehicle of magnetic particles having the surface thereof coated with a polyaminoamide phosphate.

10 Claims, No Drawings

MAGNETIC RECORDING MEDIUM AND METHOD OF MANUFACTURE

BACKGROUND OF THE INVENTION

1. Field of the Invention

This invention relates to an improved magnetic recording medium and to a method for the manufacture thereof. More particularly, this invention relates to a magnetic recording cording medium for use in high-density magnetic recording and to a method for the manufacture thereof.

2. Description of Prior Arts

Generally, magnetic recording media have conventionally been formed by applying to the surface of a non-magnetic substrate a composition obtained by kneading ferromagnetic particles with a binder vehicle. In consequence of increased utilization, the magnetic recording media are now required to have increasingly high density. For the magnetic recording medium of this class to meet this demand, it should satisfy the following requirements:

(1) The ferromagnetic particles should possess high coercive force.
(2) The ferromagnetic particles should possess a high intensity of saturated magnetization $I_s$.
(3) The ferromagnetic particles should possess small diameters, preferably not more than 0.4 μm major diameter and not more than 0.04 μm minor diameter.
(4) The ferromagnetic particles should be uniformly dispersed in the binder vehicle.
(5) The magnetic film applied to the surface of the non-magnetic substrate should be smooth enough to preclude occurrence of appreciable spacing loss from the magnetic head.

The first three (1), (2), and (3) of the total of five requirements enumerated above have now become feasible owing to the improvement in acicular iron oxide crystals, the development of acicular iron oxide particles having cobalt adsorbed thereon and acicular magnetic alloy particles using iron as a main component. The requirement (4) which calls for uniform dispersion of magnetic particles in the binder vehicle, however, poses a dilemma in that it is impeded by the fulfilment of the requirements (1) through (3).

An object of this invention, therefore, is to provide an improved magnetic recording medium for high-density magnetic recording.

Another object of this invention is to provide a magnetic recording medium for high-density magnetic recording, which has a smooth magnetic film formed on a non-magnetic substrate by the application to the substrate of a composition having very fine acicular magnetic particles of a high coercive force and a high intensity of saturated magnetization uniformly dispersed in a binder vehicle.

SUMMARY OF THE INVENTION

The objects described above are accomplished by a magnetic recording medium which is formed by dispersing, in a binder vehicle, magnetic particles coated in advance with a polyaminoamide phosphate and applying the resultant dispersion in the form of a layer to the surface of a non-magnetic substrate.

This magnetic recording medium is manufactured by mixing a solution of the polyaminoamide phosphate and magnetic particles, drying the resultant mixture thereby allowing the aforementioned magnetic particles to be individually coated with the aforementioned polyaminoamide phosphate, dispersing the coated magnetic particles in a binder vehicle solution thereby preparing a magnetic paint, applying the magnetic paint to the surface of a non-magnetic substrate, and subsequently drying the applied layer of the magnetic paint.

PREFERRED EMBODIMENT OF THE INVENTION

Generally, dispersion of ferromagnetic particles in a binder vehicle requires selection of a dispersant, a synthetic resin solution, and a kneading machine to be utilized. The present invention is supported by the idea of coating in advance the surface of ferromagnetic particles with a dispersant having high dispersibility and subsequently kneading the coated ferromagnetic particles in a prescribed resin solution. The preliminary coating of the surface of ferromagnetic particles with a dispersant of high dispersibility has the effect of precluding such undesirable phenomena as selective adsorption of the dispersant on the surface of the aforementioned particles, migration of the dispersant in the resin solution, and degradation of the elastic modulus of the magnetic film in the produced recording medium.

To aid in the dispersion of magnetic particles in a binder vehicle, alkylbenzene sulfonic acid, and salts or esters of fatty acids as well as lecithin and other natural surface active agents have heretofore been extensively used as dispersants. These dispersants, however, have not served their purpose sufficiently when they are used with magnetic particles of a class having a high coercive force, a high intensity of saturated magnetization, and a small particle diameter. To cope with this particular technical problem, there has been proposed a method which resorts to using ferromagnetic particles having the surface thereof coated with a specified surface active agent, for example. This method provides fairly advantageous dispersion of magnetic particles in the binder vehicle and gives a magnetic film of desirable surface gloss to the produced recording medium. The magnetic recording medium manufactured by this method nevertheless falls short of meeting the requirement for high-density magnetic recording.

A study of various surface active agents has led to a discovery that a dispersion with the desired efficiency is obtained by using a polyaminoamide phosphate as a surface active agent. To be specific, it has been ascertained that the magnetic particles are dispersed in the binder vehicle with the desired high efficiency and the magnetic film on the produced recording medium acquires excellent surface gloss owing to the synergism of the adoption of the polyaminoamide phosphate as a surface active agent and the coating of the surface of magnetic particles with this particular surface active agent.

The polyaminoamide phosphate is used in an amount of 0.5 to 4% by weight, preferably 1 to 3% by weight, based on the weight of magnetic particles. The coating is effected by dissolving the polyaminoamide phosphate in a lower alkanol such as methanol, ethanol, isopropanol or butanol, mixing the magnetic particles with the resultant solution, evaporating the organic solvent from the resultant mixture or separating the organic solvent from the mixture by filtration, drying the residue of evaporation or filtration, and disintegrating the resultant dry mass thereby producing magnetic particles individually having the surface thereof coated with the polyaminoamide phosphate.

Examples of magnetic particles advantageously usable in this invention include $\gamma\text{-}Fe_2O_3$, $Fe_3O_4$ and acicular particles of such compounds doped with cobalt, Fe-Co-Ni alloy and $CrO_2$ particles. Among other magnetic particles, acicular cobalt doped $\gamma\text{-}Fe_2O_3$ particles are particularly desirable. These magnetic particles are desired to have major diameters of not more than 0.4 $\mu$m and minor diameters of not more than 0.04 $\mu$m.

The magnetic particles which have been coated with the polyaminoamide phosphate are dispersed in the solution of a binder vehicle to prepare a magnetic paint. Examples of the binder vehicle advantageously usable in this invention include a mixture of a vinyl chloride-vinyl acetatevinyl alcohol copolymer with polyurethane, a mixture of nitrocellulose with polyurethane, a mixture of a polyester with polyurethane, a mixture of epoxy resin with polyurethane or vinyl chloride resin, and a mixture of vinylidene chloride resin with polyurethane. The composition, the components, etc. of the binder do not constitute any critical condition for this invention. Such binder compositions are found to be amply effective even when they contain no polyisocyanate compound. In the present invention, therefore, addition of a polyisocyanate compound to the binder composition is not essential. The solvent which may be used in the vehicle is an organic solvent incapable of dissolving the polyaminoamide phosphate. Examples of the organic solvents meeting this description are acetone, methyl ethyl ketone, methyl isobutyl ketone, toluene and xylene. The amount of the binder vehicle (as solids) is 20 to 50 parts by weight, preferably 25 to 40 parts by weight, per part by weight of the magnetic particles.

The magnetic recording medium is obtained by applying the aforementioned magnetic paint to the surface of a non-magnetic substrate and drying the applied layer of the magnetic paint. The dry layer thickness of the paint thus applied to the substrate is 1 to 10 $\mu$m, preferably 3 to 6 $\mu$m. The non-magnetic substrate may be formed of polyethylene terephthalate, for example.

The present invention will be further illustrated by certain example and control which are provided hereinafter for the purpose of illustration only and are not intended to be limiting the present invention. All parts indicated in the following example and control are by weight.

EXAMPLE

Cobalt-doped acicular $\alpha\text{-}Fe_2O_3$ particles (produced by TDK Electronics Co., Ltd. and marketed under trademark designation of "AVILYN"):
Polyaminoamide phosphate (produced by B.Y.K.-Mallinckrodt Chemische Produkte GmbH, and marketed under trademark designation of "ANTITERRA-P"): 8 parts
Ethanol: 2,000 parts These components were thoroughly mixed by stirring in a high-speed dispersion mill. The resultant mixture was filtered to separate ethanol. The residue was treated in a drier for further removal of ethanol and then pulverized. Consequently, there were obtained cobalt-doped acicular $\gamma\text{-}Fe_2O_3$ particles having the surface thereof coated with the polyaminoamide phosphate. Owing to the modification, the magnetic iron oxide acquired an oleophilic surface. Because of the oleophilic surface, the magnetic iron oxide particles were dispersible in the toluene component of a toluene-water solvent.

In the high-speed dispersion mill, 400 parts of the cobalt-doped acicular $\gamma\text{-}Fe_2O_3$ particles having the surface thereof coated as described above and a binder vehicle solution of a composition indicated below were mixed by stirring. The mixture was further treated in a sand grinder mill for thorough dispersion of the particles in the binder vehicle.

Vinyl chloride-vinyl acetate-vinyl alcohol copolymer (91 mol % of vinyl chloride component, 3 mol % of vinyl acetate component and 6 mol % of vinyl alcohol component) (produced by Union Carbide, Marketed under product designation of VAGH, molecular weight about 25,000):
Polyurethane resin (produced by Nippon Polyurethane Co., Ltd., and marketed under trademark designation of "Nipporan 2304"): 114 parts
Methyl ethyl ketone: 300 parts
Methyl isobutyl ketone: 300 parts
Toluene: 300 parts Then, the resultant dispersion was mixed by stirring with 20 parts of polyisocyanate (produced by Nippon Polyurethane Co., Ltd., and marketed under trademark designation of "Coronate L"), to produce a magnetic paint. This magnetic paint was applied to the surface of a non-magnetic substrate made of polyethylene terephthalate film of a thickness of 15 $\mu$m, and cured at 60° C. for 48 hours to afford a magnetic recording medium containing a magnetic film 5 $\mu$m in dry thickness. The surface gloss of the magnetic recording medium was 87%.

In accordance with the present invention, during the preparation of magnetic particles having the surface thereof coated with the polyaminoamide phosphate, the magnetic particles having already adsorbed the phosphate thereon are dried to expel ethanol so as to improve the physical properties of the magnetic film such as, for example, elastic modulus. The polyaminoamide phosphate is insoluble in such organic solvents as methyl ethyl ketone, methyl isobutyl ketone, or toluene which is inactive with isocyanate. For effective adsorption of the polyaminoamide phosphate on the surface of magnetic particles, use of a solvent such as an alkanol is indispensable. Such an alkanol is reactive with the polyisocyanate compound. If the alkanol is present, therefore, the addition of the polyisocyanate compound does not warrant production of a magnetic film which excels in physical properties such as elastic modulus.

This invention, therefore, ensures production of a magnetic film excelling in physical properties by using an alkanol during the uniform adsorption of the polyaminoamide phosphate on the surface of magnetic particles and, after the magnetic particles have adsorbed thereon the polyaminoamide phosphate, drying the magnetic particles fresh from the adsorption and therefore wet with the alkanol thereby removing the used alkanol from the magnetic particles so that, during the subsequent preparation of the magnetic paint, no alkanol remains and reacts with the newly added isocyanate compound.

CONTROL

Cobalt-doped acicular $\gamma\text{-}Fe_2O_3$ particles (produced by TDK Electronics Co., Ltd. and marketed under trademark designation of "AVILYN"): 400 parts
Lecithin: 8 parts Vinyl chloride-vinyl acetate-vinyl alcohol copolymer (91 mol % of vinyl chloride component, 3 mol % of vinyl acetate component and 6 mol % of vinyl alcohol component) (produced by Union Carbide, marketed under product designation of VAGH, molecular weight about 25,000): 60 parts Polyurethane resin (produced by Nippon Polyurethane Co., Ltd., and marketed under trademark designation of "Nipporan 2304"): 114 parts
Methyl ethyl ketone: 300 parts
Methyl isobutyl ketone: 300 parts
Toluene: 300 parts These components were thoroughly mixed by stirring in a high-speed dispersion mill and then mixed further in a sand grinder mill for thorough dispersion of particles. The resultant dispersion was mixed by stirring with 20 parts of polyisocyanate (produced by Nippon Polyurethane Co., Ltd, and marketed under trademark designation of "Coronate L"), to afford a magnetic paint. This magnetic paint was applied to a non-magnetic substrate made of polyethylene terephthalate film 15 μm in thickness and then cured at about 60° C. for 48 hours to produce a magnetic recording medium containing an applied coat having a dry thickness of 5 μm. The surface gloss of this magnetic recording medium was 64%.

The results indicate that the product of the example of this invention showed the surface gloss, a degree of dispersibility, about 13% higher than that of the product of the control. These facts serve so proof that magnetic recording media of high density are is obtained by the method of this invention.

As described above, the present invention concerns magnetic recording media which are formed by dispersing, in a binder vehicle, magnetic particles coated in advance with a polyaminoamide phosphate and applying the resultant dispersion in the form of a layer to the surface of a non-magnetic substrate. This invention, therefore, provides a magnetic recording media suitable for high-density magnetic recording, which possess smooth magnetic film having uniformly dispersed in a binder vehicle very fine acicular magnetic particles possessing a high coercive force and a high intensity of saturated magnetization and preferably measuring not more than 0.4 μm in major diameter and not more than 0.4 μm in minor diameter.

What is claimed is:

1. A magnetic recording medium having formed on the surface of a non-magnetic substrate, a layer comprising a binder vehicle having dispersed therein magnetic particles which are surface coated with a polyaminoamide phosphate.

2. A magnetic recording medium according to claim 1, wherein the amount of the polyaminoamide phosphate is 0.5 to 4% by weight, based on the weight of the magnetic particles.

3. A magnetic recording medium according to claim 1, wherein the magnetic particles are cobalt-doped acicular $\gamma$-$Fe_2O_3$ particles.

4. A magnetic recording medium according to claim 1, wherein the amount of the binder vehicle is 20 to 50 parts by weight per part by weight of the magnetic particles.

5. A method for the manufacture of a magnetic recording medium, comprising the steps of mixing a solution of polyaminoamide phosphate with magnetic particles, drying the resultant mixture and disintegrating the dried mass of mixture thereby preparing magnetic particles having the surface thereof individually coated with the polyaminoamide phosphate, dispersing said coated magnetic particles in a solution of binder vehicle thereby obtaining a magnetic paint, applying the magnetic paint to the surface of a non-magnetic substrate, and subsequently drying the applied layer of the magnetic paint.

6. A method according to claim 5, wherein the amount of the polyaminoamide phosphate is 0.5 to 4% by weight based on the weight of the magnetic particles.

7. A method according to claim 5, wherein the magnetic particles are cobalt-doped acicular $\gamma$-$Fe_2O_3$ particles.

8. A method according to claim 5, wherein the amount of the binder vehicle is 20 to 50 parts by weight per part by weight of the magnetic particles.

9. A method according to claim 5, wherein the solvent for the polyaminoamide phosphate is a lower alkanol.

10. A method according to claim 5, wherein the solvent for the binder vehicle solution is a polyaminoamide phosphate-insoluble organic solvent.

* * * * *